(12) United States Patent
Zhu et al.

(10) Patent No.: US 12,540,284 B2
(45) Date of Patent: Feb. 3, 2026

(54) METHODS FOR PROCESSING LIQUID ORGANIC HYDROGEN CARRIERS

(71) Applicant: Saudi Arabian Oil Company, Dhahran (SA)

(72) Inventors: Guanghui Zhu, Dhahran (SA); Raed Abudawoud, Dhahran (SA); Faisal M. Almulla, Dhahran (SA); Anas S. Al-Aqeeli, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 146 days.

(21) Appl. No.: 18/517,939

(22) Filed: Nov. 22, 2023

(65) Prior Publication Data

US 2025/0163335 A1    May 22, 2025

(51) Int. Cl.
*C10G 45/44* (2006.01)
*C10G 45/02* (2006.01)

(52) U.S. Cl.
CPC ............ *C10G 45/44* (2013.01); *C10G 45/02* (2013.01); *C10G 2300/4006* (2013.01); *C10G 2300/4012* (2013.01)

(58) Field of Classification Search
CPC ............ C10G 45/44; C10G 45/02; C10G 2300/4006; C10G 2300/4012; C10G 45/24; C10G 65/04; C10G 45/06; C10G 2300/104; C10G 2300/1044; C01B 3/0015; C01B 3/24; C07C 15/16
See application file for complete search history.

(56) References Cited

U.S. PATENT DOCUMENTS

| | | |
|---|---|---|
| 6,972,086 B2 | 12/2005 | Didillon et al. |
| 10,396,388 B2 | 8/2019 | Bosmann et al. |

(Continued)

FOREIGN PATENT DOCUMENTS

| | | |
|---|---|---|
| WO | 2018096064 A1 | 5/2018 |
| WO | 2022008847 A1 | 1/2022 |

OTHER PUBLICATIONS

Aakko-Saksa et al, Liquid Organic hydrogen carriers for transportation and storing of renewable energy, Journal of Power Sources, 396, 803-823 (Year: 2018).*

(Continued)

*Primary Examiner* — Prem C Singh
*Assistant Examiner* — Juan C Valencia
(74) *Attorney, Agent, or Firm* — DINSMORE & SHOHL LLP

(57) ABSTRACT

One or more liquid organic hydrogen carriers may be processed by a method that includes passing one or more hydrogen-diminished liquid organic hydrogen carriers and hydrogen into a hydrogenation reactor to form a hydrogenation reactor effluent. The hydrogenation reactor effluent may include one or more hydrogen-rich liquid organic hydrogen carriers and unreacted hydrogen. the method may further include passing the hydrogenation reactor effluent from the hydrogenation reactor to a separation unit and separating at least the one or more hydrogen-rich liquid organic hydrogen carriers from the unreacted hydrogen in the separation unit. The method may further include passing at least a naphtha feed and the unreacted hydrogen to a naphtha hydrotreater to produce a hydrotreater effluent that includes a hydrotreated naphtha.

20 Claims, 1 Drawing Sheet

(56) References Cited

U.S. PATENT DOCUMENTS

| | | | | |
|---|---|---|---|---|
| 10,450,194 | B2* | 10/2019 | Boesmann | C01B 3/26 |
| 2004/0000507 | A1* | 1/2004 | de Almeida | C10G 45/02 |
| | | | | 208/213 |
| 2005/0252831 | A1 | 11/2005 | Dysard et al. | |

OTHER PUBLICATIONS

Chu et al., "Hydrogen storage by liquid organic hydrogen carriers; Catalyst, renewable carrier, and technology—A reivew", Carbon Resources Conversion, vol. 6, pp. 334-351, 2023.

Garcia et al., "Hydrogenation of liquid organic hydrogen carriers: Process scale-up, economic analysis and optimization", International Journal of Hydrogen Energy, https://doi.org/10.1016/j.ijhydene.2023.06.273, Jun. 24, 2023.

Jorschick et al., "Hydrogenation of aromatic and heteroaromatic compounds—a key process for future logistics of green hydrogen using liquid organic hydrogen carrier systems", Royal Society of Chemimstry, Sustainable Energy & Fuels, vol. 5, pp. 1311-1346, 2021.

Nazir et al., "Is the H2 economy realizable in the foreseeable future? Part II: H2 storage, transportation, and distribution", International Journal of Hydrogen Energy, vol. 45, pp. 20693-20708, 2020.

Notification of Transmittal of the International Search Report and the Written Opinion of the International Searching Authority, or Declaration dated Mar. 11, 2025 pertaining to International application No. PCT/US2024/056499 filed Nov. 19, 2024, pp. 1-14.

Aakko-Saksa, Päivi T. et al., "Liquid organic hydrogen carriers for transportation and storing of renewable energy—Review and discussion", Journal of Power Sources, vol. 396, Aug. 1, 2018, pp. 803-823, Amsterdam, NL.

Teichmann, Daniel et al., "Liquid Organic Hydrogen Carriers as an efficient vector for the transport and storage of renewable energy", International Journal of Hydrogen Energy, vol. 37, No. 23, Dec. 1, 2012, pp. 18118-18132.

\* cited by examiner

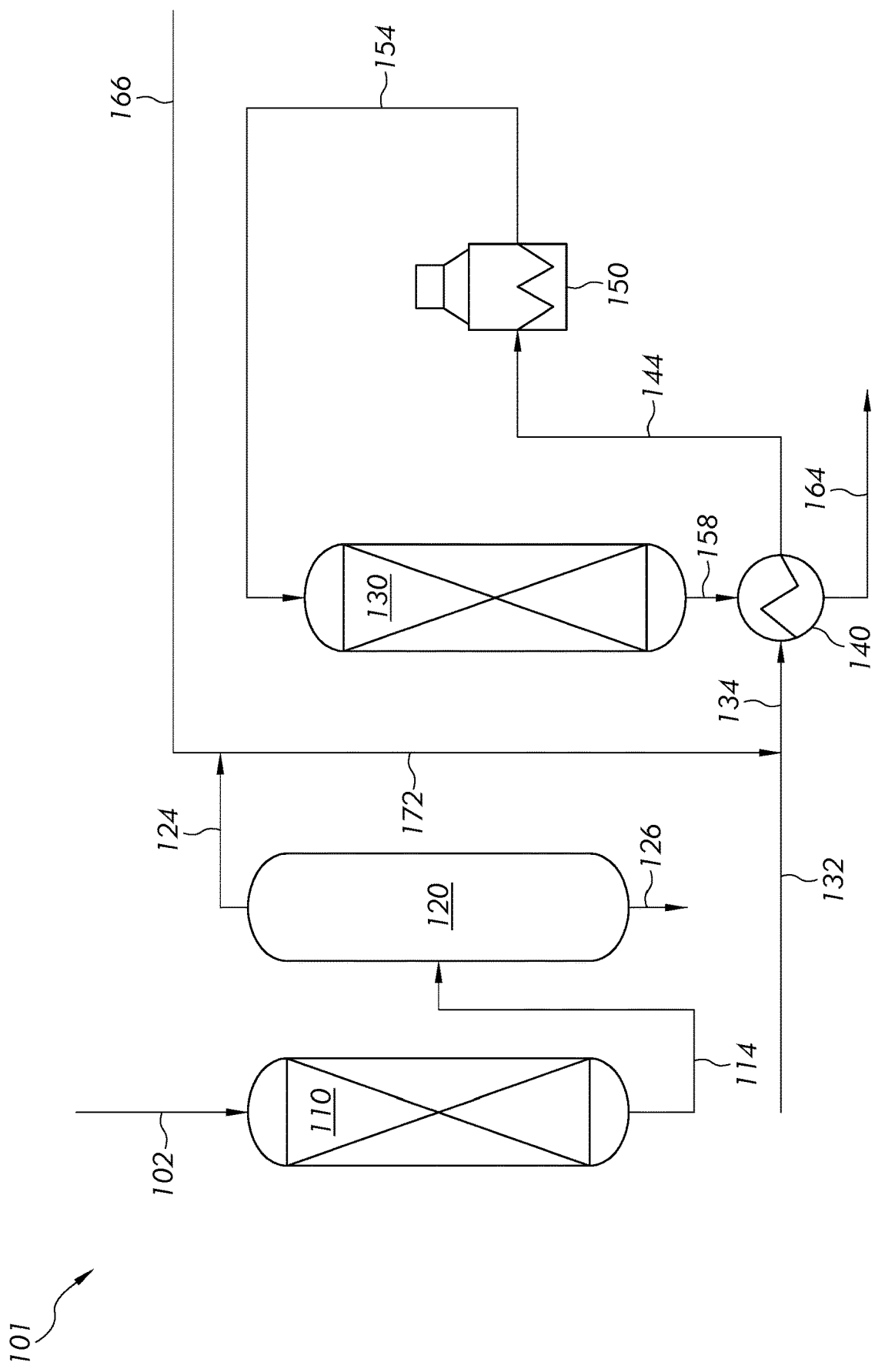

METHODS FOR PROCESSING LIQUID ORGANIC HYDROGEN CARRIERS

TECHNICAL FIELD

Embodiments of the present disclosure generally relate to chemical processing and, more specifically, to processes and systems utilized to process liquid organic hydrogen carriers.

BACKGROUND

The demand for hydrogen is currently experiencing a significant upswing driven by its critical role in addressing global energy and environmental challenges. With a growing emphasis on decarbonization and reducing greenhouse gas emissions, hydrogen is sought after as a clean and versatile energy carrier. It is increasingly used in sectors like transportation, industry, and power generation to replace fossil fuels and reduce carbon footprints. The demand is particularly pronounced in the development of fuel cell vehicles and the integration of hydrogen into industrial processes, including the production of steel and chemicals. Furthermore, hydrogen's potential for energy storage and grid stabilization, particularly when coupled with renewable energy sources, has bolstered its appeal. As nations worldwide commit to ambitious sustainability targets, the current demand for hydrogen reflects its pivotal role in achieving a greener and more sustainable energy future.

SUMMARY

Shipping and storing hydrogen present several challenges for its effective utilization as a clean energy carrier. One of the primary issues is its low energy density by volume, which means that a substantial volume of hydrogen needs to be transported to meet energy demands. Hydrogen is also highly flammable. Additionally, leakage can be a concern, as hydrogen's small molecular size makes it prone to escaping storage and transport containers. However, the presently disclosed embodiments utilize liquid organic hydrogen carriers (LOHCs) that can effectively store and transport hydrogen, releasing it when needed through chemical processes, thus enabling a practical and efficient means of utilizing hydrogen as an energy source. In particular, in the embodiments disclosed herein, charging of LOHCs is integrated with naphtha hydrotreating, a process that may be utilized in a crude oil refinery. Conventional naphtha hydrotreaters typically utilize a portion of hydrogen that is recycled after its use in the hydrotreater and an additional portion of hydrogen that is added to the system as make-up hydrogen. It has been discovered that efficiencies may be realized when the additional hydrogen portion is first utilized to charge LOHCs upstream of its use in hydrotreating naphtha. In particular, it has been discovered that the integration of LOHC charging and naphtha hydrotreating may have synergistic effects since the charging of the LOHC and the naphtha hydrotreating may take place at relatively similar temperatures and pressures. Additionally, in one or more embodiments, the charged LOHCs may be easily separable from the hydrogen following charging of the LOHC. These aspects allow for integration of LOHC charging with naphtha hydrotreating, reducing both capital and operating expenditures.

According to one or more embodiments, a liquid organic hydrogen carrier may be processed by a method that comprises passing one or more hydrogen-diminished liquid organic hydrogen carriers and hydrogen into a hydrogenation reactor to form a hydrogenation reactor effluent. The hydrogenation reactor effluent may comprise one or more hydrogen-rich liquid organic hydrogen carriers and unreacted hydrogen. The method may further comprise passing the hydrogenation reactor effluent from the hydrogenation reactor to a separation unit and separating at least the one or more hydrogen-rich liquid organic hydrogen carriers from the unreacted hydrogen in the separation unit. The method may further include passing at least a naphtha feed and the unreacted hydrogen to a naphtha hydrotreater to produce a hydrotreater effluent comprising hydrotreated naphtha.

These and other embodiments are described in more detail in the Detailed Description. It is to be understood that both the foregoing general description and the following detailed description present embodiments of the subject technology, and are intended to provide an overview or framework for understanding the nature and character of the described technology as it is claimed. The accompanying drawings are included to provide a further understanding of the presently disclosed technology and are incorporated into and constitute a part of this specification. The drawings illustrate various embodiments and, together with the description, serve to explain the principles and operations of the presently described technology. Additionally, the drawings and descriptions are meant to be merely illustrative, and are not intended to limit the scope of the claims in any manner.

BRIEF DESCRIPTION OF THE DRAWING

The following detailed description of specific embodiments of the present disclosure can be best understood when read in conjunction with the following drawings, where like structure is indicated with like reference numerals and in which:

FIG. 1 schematically depicts a diagram of a liquid organic hydrogen processing system, according to one or more embodiments described in this disclosure.

Reference will now be made in greater detail to various embodiments, some embodiments of which are illustrated in the accompanying drawings. Whenever possible, the same reference numerals will be used throughout the drawings to refer to the same or similar parts.

For the purpose of describing the simplified schematic illustrations and descriptions of the relevant figures, the numerous valves, temperature sensors, electronic controllers and the like that may be employed and well known to those of ordinary skill in the art of certain chemical processing operations are not included. Further, accompanying components that are often included in typical chemical processing operations, such as air supplies, catalyst hoppers, and flue gas handling systems, are not depicted. Accompanying components that are in hydrotreating units, such as bleed streams, spent catalyst discharge subsystems, and catalyst replacement sub-systems are also not shown. It should be understood that these components are within the spirit and scope of the present embodiments disclosed. However, operational components, such as those described in the present disclosure, may be added to the embodiments described in this disclosure.

It should further be noted that arrows in the drawings refer to process streams. However, the arrows may equivalently refer to transfer lines which may serve to transfer process streams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows which do not connect two or more system components signify a product stream which exits the depicted system or a system inlet stream which enters the depicted system. Product streams may be further processed in accompanying chemical processing systems or may be commercialized as end products. System inlet streams may be streams transferred from accompanying chemical processing systems or may be non-processed feedstock streams. Some arrows may represent recycle streams, which are effluent streams of system components that are recycled back into the system. However, it should be understood that any represented recycle stream, in some embodiments, may be replaced by a system inlet stream of the same material, and that a portion of a recycle stream may exit the system as a system product.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component. It should be understood that arrows in the relevant figures are not indicative of necessary or essential steps.

It should be understood that according to the embodiments presented in the relevant figures, an arrow between two system components may signify that the stream is not processed between the two system components. In other embodiments, the stream signified by the arrow may have substantially the same composition throughout its transport between the two system components. Additionally, it should be understood that in one or more embodiments, an arrow may represent that at least 75 wt. %, at least 90 wt. %, at least 95 wt. %, at least 99 wt. %, at least 99.9 wt. %, or even 100 wt. % of the stream is transported between the system components. As such, in some embodiments, less than all of the streams signified by an arrow may be transported between the system components, such as if a slip stream is present.

It should be understood that two or more process streams are "mixed" or "combined" when two or more lines intersect in the schematic flow diagrams of the relevant figures. Mixing or combining may also include mixing by directly introducing both streams into a like reactor, separation device, or other system component. For example, it should be understood that when two streams are depicted as being combined directly prior to entering a separation unit or reactor, that in some embodiments the streams could equivalently be introduced into the separation unit or reactor and be mixed in the reactor.

DETAILED DESCRIPTION

The present disclosure is directed to methods of processing one or more liquid organic hydrogen carriers (LOHCs) in an integrated system with naphtha hydrotreating. Generally, in the embodiments described herein, a hydrogen-diminished LOHC may be co-fed with hydrogen to a hydrogenation reactor. The hydrogen and hydrogen-diminished LOHC contact each other under conditions sufficient to produce a hydrogenation reactor effluent comprising hydrogen-rich LOHC and unreacted hydrogen. In such an arrangement, it has been discovered that unreacted hydrogen from the hydrogenation reactor effluent may be passed to a naphtha hydrotreater as make-up hydrogen to produce a hydrotreated naphtha for further processing. As is described herein, the similarity in pressure and/or temperature of the hydrogenation and hydrotreating reaction may allow for minimal processing of the hydrogen between the hydrogenation and hydrotreating.

As used in the present disclosure, passing a stream or effluent from one unit "directly" to another unit generally refers to passing the stream or effluent from the first unit to the second unit without passing the stream or effluent through an intervening reaction system or separation system that substantially changes the composition of the stream or effluent. Heat transfer devices, such as heat exchangers, preheaters, coolers, condensers, or other heat transfer equipment, and pressure devices, such as pumps, pressure regulators, compressors, or other pressure devices, are not considered to be intervening systems that change the composition of a stream or effluent. Combining two streams or effluents together also is not considered to comprise an intervening system that changes the composition of one or both of the streams or effluents being combined. Simply dividing a stream into two streams having the same composition is also not considered to comprise an intervening system that changes the composition of the stream.

As used in this disclosure, a "reactor," such as a naphtha hydrotreating reactor, described herein, refers to a vessel or series of vessels in which one or more chemical reactions may occur between one or more reactants optionally in the presence of one or more catalysts. For example, a reactor may include a tank or tubular reactor or fixed bed reactors. Reactors, as described herein, may include a series of separate reactors. Additionally, reactors may include separation devices, such as those which separate catalyst from the reaction product. Such reactors may also include catalyst regeneration sections, as would be understood by those skilled in the art.

As used in this disclosure, a "catalyst" refers to any substance which increases the rate of a specific chemical reaction. Catalysts described in this disclosure may be utilized to promote various reactions, such as, but not limited to, hydrotreating reactions. As used in this disclosure, a "hydrotreating catalyst" increases the rate of a hydrotreating reaction, which may reduce sulfur, nitrogen, metals, or other substances in a process stream. Such catalysts may have dual functionality in some embodiments. The methods described herein should not necessarily be limited by specific catalytic materials. As described herein, the catalysts may be fixed in configuration and utilize gaseous reactants. However, other configurations are contemplated.

As used in this disclosure, a "separation unit" refers to any separation device or system of separation devices that at least partially separates one or more chemicals that are mixed in a process stream from one another. For example, a separation unit may selectively separate differing chemical species, phases, or sized material from one another, forming one or more chemical fractions. Examples of separation units include, without limitation, distillation columns, flash drums, knock-out drums, knock-out pots, centrifuges, cyclones, filtration devices, traps, scrubbers, expansion devices, membranes, solvent extraction devices, and the like. It should be understood that separation processes described in this disclosure may not completely separate all of one chemical constituent from all of another chemical constituent. It should be understood that the separation processes described in this disclosure "at least partially" separate different chemical components from one another, and that even if not explicitly stated, it should be understood that separation may include only partial separation.

As used in this disclosure, a "liquid organic hydrogen carrier," often referred to as an "LOHC," is a chemical compound or substance that can reversibly absorb and release hydrogen atoms from molecular hydrogen ($H_2$). The LOHC generally acts as a vector for storing and transporting hydrogen in a liquid form. The LOHC typically undergoes hydrogenation to store hydrogen and dehydrogenation to release it when needed. In some embodiments, LOHCs may retain and/or expel hydrogen atoms by conversion of aromatic rings into non-aromatic, cyclo-alkane moieties. Sometimes conversion of aromatic moieties to cyclo-alkane moieties may be described as "charging" of an LOHC with hydrogen, as is understood in the art. Examples of LOHC include, without limitation, benzyltoluuene, dibenzyltoluene. n-ethylcarbazole, tetrahydronaphthalene, decalin, methylcyclohexane, diethylcyclohexane, and the like. Hydrogen-rich refers to the state of the LOHC where it retains hydrogen, such as by having one or more saturated rings (i.e., cyclo-hexane moieties). Hydrogen-diminished refers to the state of an LOHC where it does not retain hydrogen, such as by having one or more aromatic moieties that may be later hydrogenated. In some embodiments, hydrogen-diminished LOHCs may include aromatic and/or alkenyl functional groups, while hydrogen-diminished LOHCs include alkyl functionalities where these aromatic and/or alkenyl functionalities were present in the hydrogen-diminished state.

As used in this disclosure, the term "effluent" may refer to a stream that is passed out of a reactor, a reaction zone, or a separation unit following a particular reaction or separation. Generally, an effluent has a different composition than the stream that entered the separation unit, reactor, or reaction zone. It should be understood that when an effluent is passed to another system unit, only a portion of that system stream may be passed.

As described herein, a "naphtha hydrotreater" generally refers to a unit within a refinery designed to perform the hydrotreating process on naphtha fractions. Naphtha is a hydrocarbon feedstock with a wide boiling range and is commonly used for producing gasoline, petrochemicals, and other high-value products, as is understood by those skilled in the art. As described herein, naphtha may be heavy naphtha, light naphtha, or any cut of naphtha. In some embodiments, the naphtha may be heavy naphtha and may have a minimum boiling point in a range of from 80° C. to 100° C. and a maximum boiling point in a range of from 180° C. to 220° C.". The naphtha hydrotreater aims to remove impurities and contaminants, such as sulfur, nitrogen, and olefins, from the naphtha by subjecting it to high-temperature, high-pressure conditions in the presence of hydrogen and a hydrotreating catalyst.

The methods for processing one or more liquid organic hydrogen carriers described herein may utilize the processing system of FIG. 1. The methods are described in the context of the system of FIG. 1, but it is contemplated that many other systems may be suitable for the methods described herein. In particular, other systems and methods than those described with respect to FIG. 1 may be suitable, such as, without limitation, alternative separation schemes, alternative stream processing, and the ordering of the separation and/or processing steps disclosed. In particular, FIG. 1 will be described in detail herein, where various streams and processes described herein will be described in the context of the system of FIG. 1. However, the steps, streams, or other features of the disclosed methods stand independent of the system of FIG. 1, and FIG. 1 is merely provided to show one or more suitable systems as presently contemplated.

Now referring to FIG. 1, a hydrogen charging system 101 is depicted within existing refinery infrastructure, comprising a hydrogenation reactor 110, a separation unit 120, and a naphtha hydrotreater 130. These system components will be described in detail herein.

According to one or more embodiments, a hydrogen-diminished LOHC and hydrogen may be passed into a hydrogenation reactor 110 via hydrogenation reactor feed 102 to form a hydrogenation reactor effluent 114. The hydrogenation reactor effluent 114 may comprise one or more hydrogen-rich LOHCs and unreacted hydrogen. As depicted in FIG. 1, a hydrogenation reactor feed 102 may be passed to the hydrogenation reactor 110. The hydrogenation reactor feed 102 may comprise a hydrogen-diminished LOHC and hydrogen. The hydrogen within the hydrogenation reactor feed 102 may be additional hydrogen added to the system 101 (e.g., not recycled from the heat-exchanged hydrotreated effluent 164, discussed later herein). The hydrogen passed to the hydrogenation reactor 110 may come from any hydrogen source, such as that produced by, for example, electrolysis by any fuel source such as fossil fuels, wind, or solar.

The hydrogenation reactor feed 102 may comprise 1 wt. % to 99 wt. % hydrogen-diminished LOHC and 1 wt. % to 99 wt. % hydrogen. In embodiments, the hydrogenation reactor feed 102 may comprise greater than or equal to 1 wt. %, greater than or equal to 10 wt. %, greater than or equal to 20 wt. %, greater than or equal to 30 wt. %, or greater than or equal to 40 wt. % hydrogen-diminished LOHC. In other embodiments, the hydrogenation reactor feed 102 may comprise greater than or equal to 1 wt. %, greater than or equal to 10 wt. %, greater than or equal to 20 wt. %, greater than or equal to 30 wt. %, or greater than or equal to 40 wt. % hydrogen. It is contemplated the amount of hydrogen-diminished liquid organic hydrogen carrier and hydrogen in the hydrogenation reactor feed 102 may fluctuate depending on industry need and how much hydrogen may be desired to be eventually passed to the naphtha hydrotreater 130 as make-up hydrogen.

As depicted in FIG. 1, the hydrogenation reactor feed 102 may be passed to the hydrogenation reactor 110. The hydrogenation reactor 110 may be operable to at least partially hydrogenate the hydrogen-diminished LOHC to produce a hydrogenation reactor effluent 114 comprising a hydrogen-rich LOHC and unreacted hydrogen. The hydrogen-diminished LOHC may be benzyltoluene. It is contemplated that benzyltoluene may be produced by the refinery where system 101 is located, such as in an aromatics complex of a refinery.

In Reaction I, depicted below, benzyltoluene reacts with hydrogen to form perhydro benzyltoluene. This reaction may be performed with a catalyst, such as, but not limited to, cobalt-molybdenum (Co—Mo), nickel-molybdenum (Ni—Mo), nickel-tungsten (Ni—W), and/or noble metal catalysts. In embodiments, the catalyst may be supported by alumina. Without being bound by any theory, sulfide catalysts such as cobalt-molybdenum (Co—Mo) nickel-molybdenum (Ni—Mo) may be utilized because they may contain active metal sites, which are capable of promoting the hydrogenation reactions and may outperform other catalysts.

Reaction I

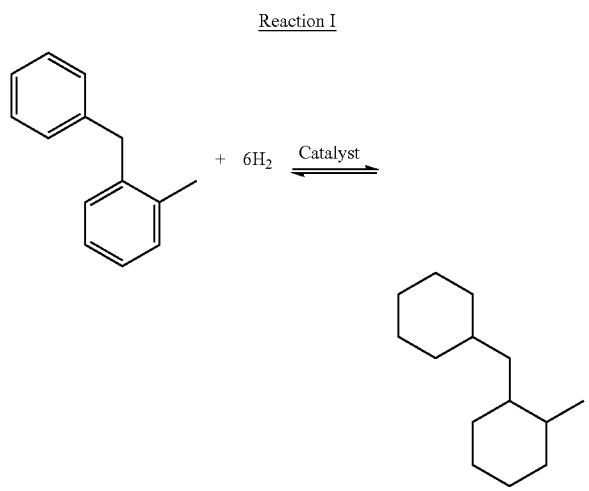

As is described herein, in embodiments, the hydrogenation reactor 110 may operate at a temperature and pressure sufficient to hydrogenate the hydrogen-diminished LOHC. For example, in embodiments where the hydrogen-diminished liquid organic hydrogen carrier is benzyltoluene, the hydrogenation reactor 110 may operate at a temperature of from 200° C. to 260° C., such as from 200° C. to 220° C., from 220° C. to 240° C., from 240° C. to 260° C., or any combination of these ranges. It is contemplated that the hydrogenation reactor 110 and the naphtha hydrotreater 130 may operate with a difference in temperature of less than or equal to 25° C. (such as less than or equal to 20° C., less than or equal to 15° C., less than or equal to 10° C., or even less than or equal to 5° C.). In embodiments, the hydrogenation reactor 110 may operate at a pressure of from 2.5 MPa (25 bar) to 4.5 MPa (45 bar), such as from 2.5 mPa to 3 MPa, from 3 MPa to 3.5 MPa, from 3.5 MPa to 4 MPa, from 4 MPa to 4.5 MPa, or any combination of one or more of these ranges. It is contemplated that the hydrogenation reactor 110 and the naphtha hydrotreater 130 may operate with a difference in pressure of less than or equal to 1.0 MPa (10 bar) (such as less than or equal to 0.8 MPa, less than or equal to 0.6 MPa, less than or equal to 0.4 MPa, or even less than or equal to 0.2 MPa).

According to one or more embodiments, the hydrogenation reactor effluent 114 may be passed from the hydrogenation reactor 110 to a separation unit 120 and separated into at least one more hydrogen-rich LOHCs and unreacted hydrogen in the separation unit 120. As depicted in FIG. 1, the hydrogenation reactor effluent 114 may be passed to a separation unit 120. In some embodiments, such as depicted in FIG. 1, the hydrogenation reactor effluent 114 is separated into two streams, an unreacted hydrogen stream 124 and a hydrogen-rich LOHC stream 126. The hydrogen-rich LOHC stream 126 may be passed downstream for storage or transportation. Such hydrogen-rich LOHC may be later hydrogenated at a different facility in a different geographic location to form hydrogen gas. As such, the hydrogen from the hydrogenation reactor feed 102 may be transported in a liquid form to its destination, rather than being transported as a compressed hydrogen gas.

In one or more embodiments, the separation unit 120 may be a flash drum or distillation column. Perhydro benzyltoulene has a boiling point of from 260° C. to 280° C. at atmospheric pressure, allowing a relatively easy separation from hydrogen by boiling point at a variety of pressures that may be present in the separation unit 120.

According to one or more embodiments, a naphtha feed 132 and the unreacted hydrogen stream 124 may be passed to a naphtha hydrotreater 130 to produce a hydrotreater effluent 158 comprising hydrotreated naphtha. The naphtha feed may be a cut from an atmospheric distillation column processing crude oil, such as at a refinery. As depicted in FIG. 1, the unreacted hydrogen stream 124 may be passed to the naphtha hydrotreater 130. According to one or more embodiments, the unreacted hydrogen stream 124 may be combined with a naphtha feed 132 prior to passing the unreacted hydrogen stream 124 to the naphtha hydrotreater 130 to form hydrotreater feed 134. In some embodiments, the unreacted hydrogen stream 124 from the separation unit 120 does not change more than 10 bar pressure after exiting the hydrogenation reactor 110 the separation unit 120. Accordingly, the unreacted hydrogen stream 124 may not need to undergo re-compression after separation in the separation unit 120. For example, the unreacted hydrogen stream 124 may be at about the same pressure (e.g., less than or equal to 10 bar difference) as the hydrogenation reactor 110, and the hydrogenation reactor 110 may operate at a pressure within 10 bar of the naphtha hydrotreater 130, as explained in more detail below. Therefore, the unreacted hydrogen stream 124 may not need re-pressurized prior to combining the unreacted hydrogen with the naphtha feed 132 upstream of the naphtha hydrotreater 130.

As depicted in FIG. 1, the hydrotreater feed 134 may be heated by a hydrotreated effluent 158 in a heat-exchanger 140, which may pre-heat the hydrotreater feed 134 upstream of the naphtha hydrotreater 130 and form a pre-heated hydrotreater feed 144. In some embodiments, the pre-heated hydrotreater feed 144 may be further heated by a heater 150, such as a furnace, fired heater, or the like. The heater 150 may heat the pre-heated hydrotreater feed 144 to form a heated hydrotreater feed 154. It should be understood that some embodiments may not include the heat-exchanger 140, and the hydrotreater feed 134 may be passed to the heater 150 upstream of the naphtha hydrotreater 130. In embodiments that include a heat-exchanger 140, the hydrotreater feed 134 may be passed to the naphtha hydrotreater 130 via heated hydrotreater feed 154 after being heated in the heat-exchanger 140. According to additional embodiments not shown in FIG. 1, the hydrotreater feed 134 may be further heated, such as, and without limitation, by additional heat exchangers, furnaces, fired heaters, and the like before entering the naphtha hydrotreater 130.

instill referring to FIG. 1, the heated hydrotreater feed 154 may be passed to a naphtha hydrotreater 130. The naphtha hydrotreater 130 may comprise at least one hydrotreating catalyst. It is contemplated that the at least one hydrotreating catalyst, may be cobalt-molybdenum (Co—Mo), nickel-molybdenum (Ni—Mo), nickel-tungsten (Ni—W), and/or noble metal catalysts. In embodiments, the catalyst may be supported by alumina. The naphtha hydrotreater 130 may be operable to at least partially reduce the content of metals, sulfur, or nitrogen in the heated hydrotreater feed 154 to produce a hydrotreated effluent 158. For example, the hydrotreated effluent 158 passed out of the naphtha hydrotreater 130 may have a lesser amount of one or more of sulfur, metals, or nitrogen than the heated hydrotreater feed 154 by at least 25%, at least 50%, or even at least 75%.

As is described herein, in embodiments, the naphtha hydrotreater 130 may operate at a temperature and pressure sufficient to hydrotreat the naphtha. For example, the naphtha hydrotreater 130 may operate at a temperature of from 225° C. to 275° C., such as from 225° C. to 235° C., from 235° C. to 245° C., from 245° C. to 255° C., from 255° C. to 265° C., from 265° C. to 275° C., or any combination of these ranges. It is contemplated that the naphtha hydrotreater 130 and the hydrogenation reactor 110 may operate with a difference in temperature of less than or equal to 25° C. (such as less than or equal to 20° C., less than or equal to 15° C., less than or equal to 10° C., or even less than or equal to 5° C.). In embodiments, the naphtha hydrotreater 130 may operate at a pressure of from 2.5 MPa (25 bar) to 4.5 MPa (45 bar), such as from 2.5 mPa to 3 MPa, from 3 MPa to 3.5 MPa, from 3.5 MPa to 4 MPa, from 4 MPa to 4.5 MPa, from 4.5 MPa to 5 MPa, or any combination of one or more of these ranges. It is contemplated that the naphtha hydrotreater 130 and the hydrogenation reactor 110 operate with a difference in pressure of less than or equal to 1.0 MPa (10 bar) (such as less than or equal to 0.8 MPa, less than or equal to 0.6 MPa, less than or equal to 0.4 MPa, or even less than or equal to 0.2 MPa).

According to some embodiments, the catalyst to feed ratio of the heated hydrotreater feed 154 may be from 5 to 100. For example, the catalyst to feed ratio of the heated hydrotreater feed 154 may be from 5 to 10, from 10 to 20, from 20 to 30, from 30 to 40, from 40 to 50, from 50 to 60, from 60 to 70, from 70 to 80, from 80 to 90, or from 90 to 100. Catalyst to feed ratio is described in weight/weight terms unless otherwise specified herein.

Following hydrotreating of the heated hydrotreater feed 154 resulting in the formation of the hydrotreated effluent 158, the hydrotreated effluent 158 may be heat-exchanged with the hydrotreater feed 134 to form a heat-exchanged hydrotreated effluent 164. According to some embodiments not shown in FIG. 1, the heat-exchanged hydrotreated effluent 164 may be separated into multiple streams to form hydrogen and a hydrotreated naphtha. The hydrotreated naphtha may be passed downstream for further processing (e.g., reforming) and eventual use in a gasoline blend pool. The hydrogen separated from the heat-exchanged hydrotreated effluent 164 re-enter the system 101 as recycled hydrogen stream 166. It is contemplated that the recycled hydrogen stream 166 may be combined with the unreacted hydrogen stream 124 to form a mixed hydrogen stream 172. The mixed hydrogen stream 172 may be combined with the naphtha feed 132 upstream of the naphtha hydrotreater 130. As such, hydrogen may be recycled in the system, where the unreacted hydrogen stream 124 acts as the make-up hydrogen needed for the hydrotreating.

The present disclosure includes multiple aspects. A first aspect is a method for processing one or more liquid organic hydrogen carriers, the method comprising: passing one or more hydrogen-diminished liquid organic hydrogen carriers and hydrogen into a hydrogenation reactor to form a hydrogenation reactor effluent, wherein the hydrogenation reactor effluent comprises one or more hydrogen-rich liquid organic hydrogen carriers and unreacted hydrogen; passing the hydrogenation reactor effluent from the hydrogenation reactor to a separation unit and separating at least the one or more hydrogen-rich liquid organic hydrogen carriers from the unreacted hydrogen in the separation unit; and passing at least a naphtha feed and the unreacted hydrogen to a naphtha hydrotreater to produce a hydrotreater effluent comprising hydrotreated naphtha.

A second aspect of the present disclosure may include the first aspect, wherein the hydrogenation reactor and the naphtha hydrotreater operate with a difference in pressure of less than or equal to 10 bar.

A third aspect of the present disclosure may include any of the previous aspects, wherein the hydrogenation reactor operates at a pressure of from 25 bar to 50 bar and the naphtha hydrotreater operates at a pressure of from 25 bar to 45 bar.

A fourth aspect of the present disclosure may include any of the previous aspects, wherein the hydrogenation reactor and the naphtha hydrotreater operate with a difference in pressure of less than or equal to 10 bar; and the hydrogenation reactor operates at a temperature of from 25 bar to 50 bar and the naphtha hydrotreater operates at a temperature of from 25 bar to 45 bar.

A fifth aspect of the present disclosure may include any of the previous aspects, wherein the hydrogenation reactor and the naphtha hydrotreater operate with a difference in temperature of less than or equal to 25° C.

A sixth aspect of the present disclosure may include any of the previous aspects, wherein the hydrogenation reactor operates at a temperature of from 200° C. to 260° C. and the hydrotreater operates at a temperature of from 225° C. to 275° C.

A seventh aspect of the present disclosure may include any of the previous aspects, wherein the hydrogenation reactor and the naphtha hydrotreater operate with a difference in temperature of less than or equal to 25° C.; and the hydrogenation reactor operates at a temperature of from 200° C. to 260° C. and the hydrotreater operates at a temperature of from 225° C. to 275° C.

An eighth aspect of the present disclosure may include any of the previous aspects, wherein the hydrogenation reactor and the naphtha hydrotreater operate with a difference in pressure of less than or equal to 10 bar; and the hydrogenation reactor and the naphtha hydrotreater operate with a difference in temperature of less than or equal to 25° C.

A ninth aspect of the present disclosure may include any of the previous aspects, wherein the one or more hydrogen-diminished liquid organic hydrogen carriers comprises benzyltoluene and the one or more hydrogen-rich liquid organic hydrogen carriers comprises perhydro benzyltoluene.

A tenth aspect of the present disclosure may include any of the previous aspects, wherein the naphtha feed has a minimum boiling point in a range of from 80° C. to 100° C. and a maximum boiling point in a range of from 180° C. to 220° C.

An eleventh aspect of the present disclosure may include any of the previous aspects, wherein the hydrogenation reactor comprises a catalyst.

A twelfth aspect of the present disclosure may include any of the previous aspects, further comprising combining the naphtha and the unreacted hydrogen upstream of the naphtha hydrotreater.

A thirteenth aspect of the present disclosure may include any of the previous aspects, wherein the hydrotreater effluent further comprises hydrogen.

A fourteenth aspect of the present disclosure may include the thirteenth aspect, further comprising separating the hydrogen from the hydrotreated naphtha in the hydrotreater effluent to produce a recycled hydrogen stream.

A fifteenth aspect of the present disclosure may include the fourteenth aspect, further comprising combining the recycled hydrogen stream with the unreacted hydrogen to form a mixed hydrogen stream; and combining the mixed hydrogen stream and the naphtha feed upstream of the hydrotreater.

A sixteenth aspect of the present disclosure may include any of the previous aspects, wherein the hydrotreater effluent has a lesser amount of one or more of sulfur, metals, or nitrogen than the naphtha feed.

A seventeenth aspect of the present disclosure may include any of the previous aspects, further comprising heat-exchanging the unreacted hydrogen, the naphtha, or both, with the hydrotreated naphtha to form a pre-heated hydrotreater feed.

An eighteenth aspect of the present disclosure may include the seventeenth aspect, further comprising heating the pre-heated hydrotreater feed by a furnace upstream of the naphtha hydrotreater.

A nineteenth aspect of the present disclosure may include any of the previous aspects, further comprising heating the unreacted hydrogen, the naphtha, or both by a furnace upstream of the naphtha hydrotreater.

A twentieth aspect of the present disclosure may include any of the previous aspects, wherein at least one of the hydrogen-rich liquid organic hydrogen carriers has a boiling point of from 260° C. to 280° C.

The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure. It should be appreciated that compositional ranges of a chemical constituent in a composition should be appreciated as containing, in some embodiments, a mixture of isomers of that constituent. In additional embodiments, the chemical compounds may be present in alternative forms such as derivatives, salts, hydroxides, etc.

It is also noted that recitations herein of "at least one" component, element, etc., should not be used to create an inference that the alternative use of the articles "a" or "an" should be limited to a single component, element, etc.

It should further be understood that streams may be named for the components of the stream, and the component for which the stream is named may be the major component of the stream (such as comprising from 50 weight percent (wt. %), from 70 wt. %, from 90 wt. %, from 95 wt. %, from 99 wt. %, from 99.5 wt. %, or even from 99.9 wt. % of the contents of the stream to 100 wt. % of the contents of the stream). It should also be understood that components of a stream are disclosed as passing from one system component to another when a stream comprising that component is disclosed as passing from that system component to another. For example, a disclosed "naphtha stream" passing from a first system component to a second system component should be understood to equivalently disclose "naphtha" passing from a first system component to a second system component, and the like.

What is claimed is:

1. A method for processing one or more liquid organic hydrogen carriers, the method comprising:
    passing one or more hydrogen-diminished liquid organic hydrogen carriers and hydrogen into a hydrogenation reactor to form a hydrogenation reactor effluent, wherein the hydrogenation reactor effluent comprises one or more hydrogen-rich liquid organic hydrogen carriers and excess hydrogen not used for the hydrogenation of the hydrogen-diminished liquid organic hydrogen carriers;
    passing the hydrogenation reactor effluent from the hydrogenation reactor to a separation unit and separating at least the one or more hydrogen-rich liquid organic hydrogen carriers from the excess hydrogen in the separation unit; and
    passing at least a naphtha feed and the excess hydrogen to a naphtha hydrotreater to produce a hydrotreater effluent comprising hydrotreated naphtha.

2. The method of claim 1, wherein the hydrogenation reactor and the naphtha hydrotreater operate with a difference in pressure of less than or equal to 10 bar.

3. The method of claim 1, wherein the hydrogenation reactor operates at a pressure of from 25 bar to 50 bar and the naphtha hydrotreater operates at a pressure of from 25 bar to 45 bar.

4. The method of claim 1, wherein:
    the hydrogenation reactor and the naphtha hydrotreater operate with a difference in pressure of less than or equal to 10 bar; and
    the hydrogenation reactor operates at a temperature of from 25 bar to 50 bar and the naphtha hydrotreater operates at a temperature of from 25 bar to 45 bar.

5. The method of claim 1, wherein the hydrogenation reactor and the naphtha hydrotreater operate with a difference in temperature of less than or equal to 25° C.

6. The method of claim 1, wherein the hydrogenation reactor operates at a temperature of from 200° C. to 260° C. and the hydrotreater operates at a temperature of from 225° C. to 275° C.

7. The method of claim 1, wherein:
    the hydrogenation reactor and the naphtha hydrotreater operate with a difference in temperature of less than or equal to 25° C.; and
    the hydrogenation reactor operates at a temperature of from 200° C. to 260° C. and the hydrotreater operates at a temperature of from 225° C. to 275° C.

8. The method of claim 1, wherein:
    the hydrogenation reactor and the naphtha hydrotreater operate with a difference in pressure of less than or equal to 10 bar; and
    the hydrogenation reactor and the naphtha hydrotreater operate with a difference in temperature of less than or equal to 25° C.

9. The method of claim 1, wherein the one or more hydrogen-diminished liquid organic hydrogen carriers comprises benzyltoluene and the one or more hydrogen-rich liquid organic hydrogen carriers comprises perhydro benzyltoluene.

10. The method of claim 1, wherein the naphtha feed has a minimum boiling point in a range of from 80° C. to 100° C. and a maximum boiling point in a range of from 180° C. to 220° C.

11. The method of claim 1, wherein the hydrogenation reactor comprises a catalyst.

12. The method of claim 1, further comprising combining the naphtha and the excess hydrogen upstream of the naphtha hydrotreater.

13. The method of claim 1, wherein the hydrotreater effluent further comprises hydrogen.

14. The method of claim 13, further comprising separating the hydrogen from the hydrotreated naphtha in the hydrotreater effluent to produce a recycled hydrogen stream.

15. The method of claim 14, further comprising:
combining the recycled hydrogen stream with the excess hydrogen to form a mixed hydrogen stream; and
combining the mixed hydrogen stream and the naphtha feed upstream of the hydrotreater.

16. The method of claim 1, wherein the hydrotreater effluent has a lesser amount of one or more of sulfur, metals, or nitrogen than the naphtha feed.

17. The method of claim 1, further comprising heat-exchanging the excess hydrogen, the naphtha, or both, with the hydrotreated naphtha to form a pre-heated hydrotreater feed.

18. The method of claim 17, further comprising heating the pre-heated hydrotreater feed by a furnace upstream of the naphtha hydrotreater.

19. The method of claim 1, further comprising heating the excess hydrogen, the naphtha, or both by a furnace upstream of the naphtha hydrotreater.

20. The method of claim 1, wherein at least one of the hydrogen-rich liquid organic hydrogen carriers has a boiling point of from 260° C. to 280° C.

\* \* \* \* \*